United States Patent [19]

Gaetzi

[11] 4,176,246
[45] Nov. 27, 1979

[54] APPARATUS FOR THE TRANSMISSION END-ENCIPHERING AND RECEPTION END-DECIPHERING OF INFORMATION

[75] Inventor: Robert Gaetzi, Steinhausen, Switzerland

[73] Assignee: Anstalt Europaische Handelsgesellschaft, Liechtenstein

[21] Appl. No.: 886,532

[22] Filed: Mar. 14, 1978

[30] Foreign Application Priority Data

Mar. 16, 1977 [CH] Switzerland .................. 3307/77

[51] Int. Cl.² .............................................. H04L 9/00
[52] U.S. Cl. ...................................................... 178/22
[58] Field of Search ........................................... 178/22

[56] References Cited

U.S. PATENT DOCUMENTS

| 3,546,380 | 12/1970 | Sturzinger | 178/22 |
| 3,683,513 | 8/1972 | Nyberg | 178/22 |
| 3,725,579 | 4/1973 | Sturzinger | 178/22 |
| 3,752,920 | 8/1973 | Gemperle | 178/22 |
| 4,079,195 | 3/1978 | Fruteger | 178/22 |

*Primary Examiner*—Howard A. Birmiel
*Attorney, Agent, or Firm*—Ostrolenk, Faber, Gerb & Soffen

[57] ABSTRACT

An apparatus for the transmission end-enciphering and reception end-deciphering of information comprising an enciphering device arranged at the transmitter for receiving plain text in the form of information signal groups separated from one another by separation or partition signals. At the transmitter there is provided a controllable control circuit operatively connected with a key character-information storage. The control circuit, when activated, causing a change of the key character information entered by the key character-information storage to the enciphering device and due to such change replacing the separation signals between the information signal groups by control signals representative of the key character-information. At the receiver there is provided a control circuit operatively connected with a further key character-information storage, this control circuit upon determination of the control signals indicative of a change of the key character-information causing a corresponding change of the key character-information delivered by such further key character-information storage to the deciphering device and which again replaces such control signals by the separation signals originally entered at the side of the transmitter, so that the signal sequence appearing at the output side of the deciphering device again corresponds to the signal sequence entered at the enciphering device.

5 Claims, 2 Drawing Figures

APPARATUS FOR THE TRANSMISSION END-ENCIPHERING AND RECEPTION END-DECIPHERING OF INFORMATION

BACKGROUND OF THE INVENTION

The present invention relates to a new and improved apparatus for the transmission end-enciphering and reception end-deciphering of information.

The apparatus of the present invention is generally of the type comprising an enciphering device arranged at the side of the transmitter which receives the plain text in the form of information signal groups, separated from one another by separation or partition signals, and is connected with a key character-information storage which delivers to the enciphering device the key character-information needed for enciphering. There is further provided a deciphering device arranged at the side of the receiver, which deciphers the received information and is connected with a key character-information storage which delivers key character-information needed for deciphering to the deciphering device. Both at the key character-information storage at the transmitter and at the key character-information storage at the receiver there are stored at least two different key character-information, wherein selectively in each case one such type of key character-information can be entered to the enciphering device and deciphering device respectively.

In the telecommunications art, information is frequently transmitted in a binary code in the form of pulse trains. A classic example for such information transmission is the CCITT-Code 2 used in teleprinter networks. With this code each character is represented by a combination of 5 binary pulses. With a start-stop technique there is introduced before and after each pulse group representing a character a start step and a stop step, so as to thus ensure for synchronisation of the transmitter equipment and receiver equipment.

The present day regulations require that there be transmitted by the transmitter equipment a stop step which has a length amounting to at least 1.4-fold that of an information step and that the receiver end-equipment can still detect and process steps of 0.8-fold length as stop steps.

While taking into account these characteristics it is possible at the present time to design transmission systems which synchronously operate in a reliable manner. Such type transmission system has been disclosed, for instance, in U.S. Pat. No. 3,702,900, to which reference may be readily had and the disclosure of which is incorporated herein by reference.

During the synchronous operation of transmission systems of this type, there are no longer required all of the start-stop steps for ensuring synchronisation of the system.

SUMMARY OF THE INVENTION

Hence, it is a primary object of the present invention to exploit the fact that along the transmission path between the transmitter and receiver it is not absolutely necessary to evaluate all of the separation signals.

Now in order to implement this object and others which will become more readily apparent as the description proceeds, the apparatus of the previously mentioned type is manifested by the features that there is provided at the side of the transmitter a controllable control circuit which is operatively connected with the key character-information storage at the transmitter. This control circuit, when activated, causes a change of the key character-information entered by the key character-information storage to the enciphering device and replacing the partition signals appearing between the information signal groups, by virtue of such change, with control signals representative of the key character-information. At the receiver there is provided a control circuit which is operatively connected with the key character-information storage at the receiver, this control circuit, upon detection of control signals representative of a change of the key character-information, causing a corresponding change of the key character-information delivered by the key character-information storage to the deciphering device and which again replaces such control signals by the separation signals originally introduced at the side of the transmitter, so that the signal sequence appearing at the output side of the deciphering device again corresponds to the signal sequence infed at the enciphering device.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
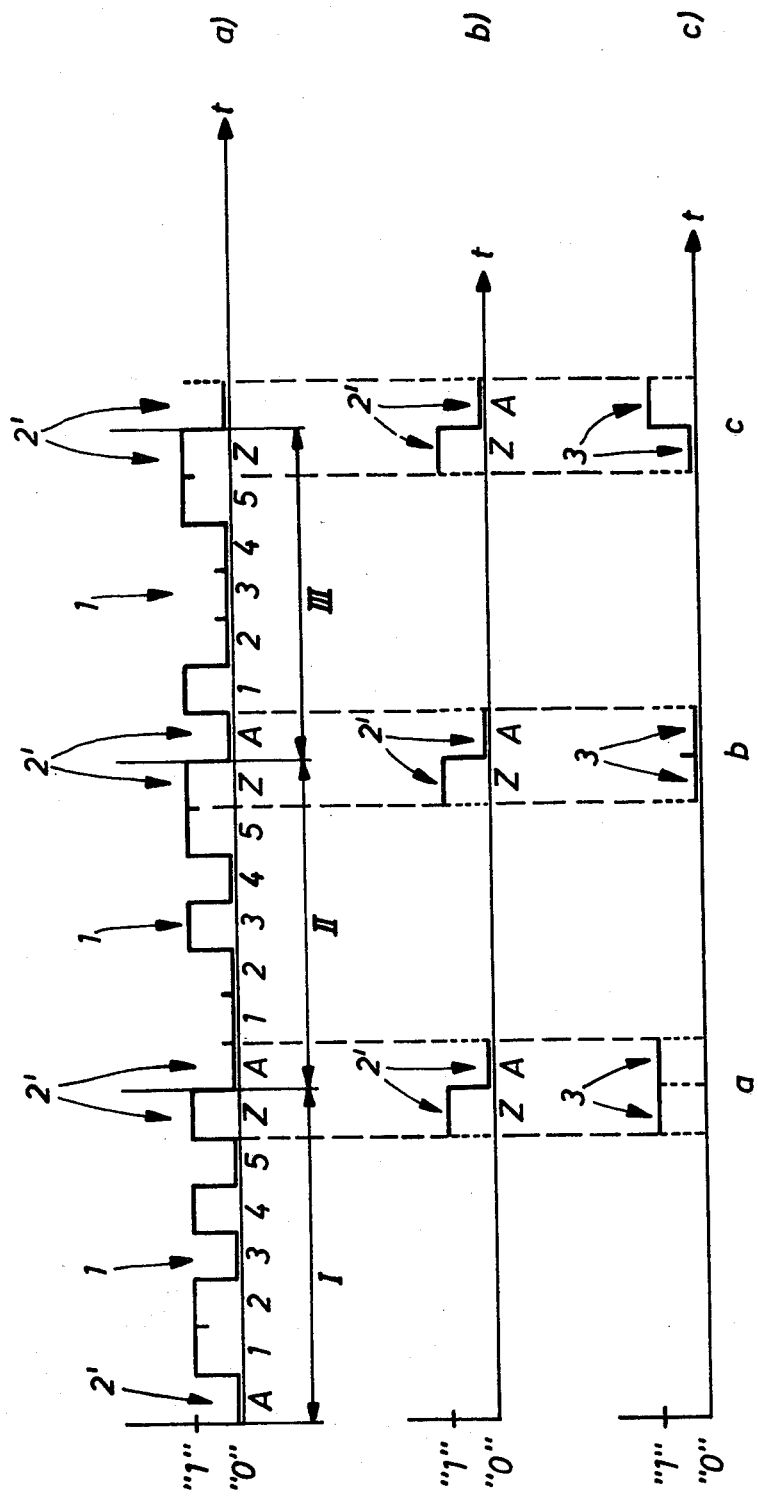
FIG. 1 illustrates different pulse-time graphs.

Describing now the drawings, in the top graph (a) of FIG. 1 there have been shown a number of characters I, II and III which have been represented by binary signals in accordance with the CCITT-Code 2. Each character I, II and III consists of the actual information signals 1, 2, 3, 4 and 5, which are delimited by a start signal A and a stop signal Z. The information signal groups 1 formed by the information signals 1-5 are separated from one another by the separation or partition signals 2' which are formed by the stop signals Z and the start signals A.

If there is considered the transmission path between the transmitter and receiver, then there appear at uniform intervals the separation or partition signals 2', i.e. the stop signals Z and the start signals A. as best seen by referring to the graph (b) shown in FIG. 1.

As mentioned, these stop signals Z and start signals A are not absolutely required in a synchronously operating system, since synchronization of the transmitter and receiver is ensured by other means, for instance by "flywheel" synchronization. The present invention is predicated upon the concept that instead of the not absolutely required start signals A and stop signals Z, it is possible to transmit control signals 3 having a certain information content. In the graph (c) of FIG. 1 there have been illustrated three possible signal combinations a, b, and c, for such control signals 3. Instead of the stop-start signals "1", "0" there can be introduced between the information signal groups 1 control signal pairs "1", "1" (combination a), "0", "0" (combination b), and "0", "1" (combination c). In the event that there are nonethelesss still required the stop signals Z and start signals A, then there can be transmitted, for instance, after each fourth or tenth information pulse group 1 a stop signal Z and start signal A, whereas at the intervals therebetween there are transmitted the aforementioned control signals 3.

It is conceivable not to evaluate each individual signal group, composed of one signal 3, as concerns its information content, but rather, for instance, to evaluate in each case two successive signal combinations a, b, c according to the showing of the graph (c) of FIG. 1. In this way there is produced instead of the three different combinations according to the graph (c) of FIG. 1, nine different combinations, namely the following combinations of the signal groups a, b, c:

aa, ab, ac, ba, bb, bc, ca, cb and cc.

Figure 2:
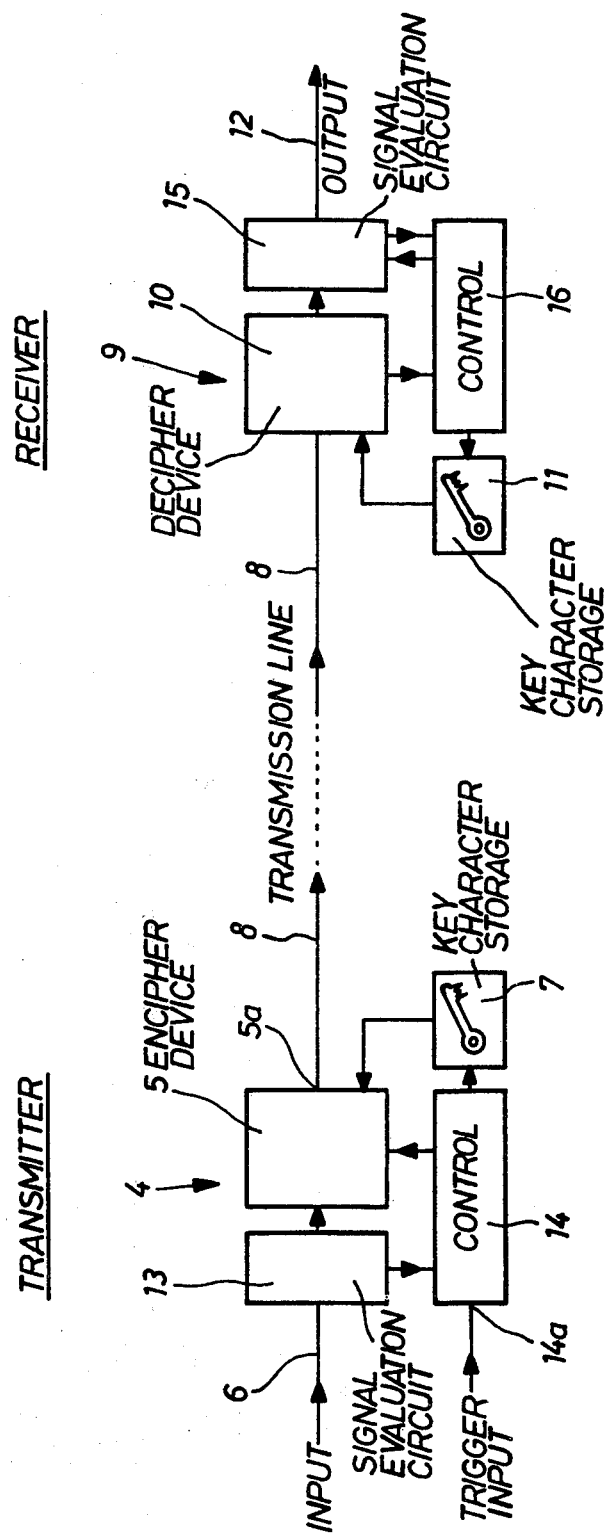
FIG. 2 is a block circuit diagram of apparatus having a transmitter station and receiver station for the respective enciphering and deciphering of information.

There will now be described on the basis of the showing of FIG. 2 equipment for the enciphering and deciphering of information.

The transmitter station or transmitter 4 will be seen to comprise an enciphering device 5 to which there is entered the information to be enciphered by means of the input line 6 from an information source. This information is delivered to the enciphering device 5 in the form of information signal or pulse groups 1 which are separated from one another by the separation or partition signals 2', as the same has been explained previously for instance on the basis of the graph (a) shown in FIG. 1. Connected with this enciphering device 5 is a key character-information storage 7 which enters the key character-information needed for enciphering to the enciphering device 5. The enciphered information is delivered to the transmission line 8 and transmitted to the receiver station or receiver 9. Information transmission can be accomplished without the use of any lines.

At the receiver station or receiver 9 the received and enciphered information is deciphered in a deciphering device 10. The key character-information required for deciphering is delivered by a key character-information storage 11 which is connected with the deciphering device 10. The deciphered information is entered by means of the output line 12 to a communications sink.

As a general rule, the key character-information storages 7, 11 of the transmitter station 4 and the receiver station 9 consist of a basic key character storage and a key character generator, as such is well known in this particular technology.

The construction and mode of operation of the enciphering device 5, the deciphering device 10 and the key character-information storages 7 and 11 is well known. For instance, in this connection reference may be made to the detailed description thereof appearing for instance in U.S. Pat. Nos. 3,083,263, 3,546,380, and 3,683,513 and the Swiss patent 443 744 which is incorporated herein by reference.

Synchronization between the transmitter end-enciphering equipment and receiver end-deciphering equipment can be accomplished for instance as taught in U.S. Pat. No. 3,752,920 or the Swiss Pat. No. 581.930, the disclosure of which is incorporated herein by reference.

Both at the key character-information storage 7 of the transmitter station 4 as well as at the key character-information storage 11 of the receiver station 9 there are stored at least two equivalent, selectively employable, different key character-information. However, there is only entered in each case one such type key character-information to the associated enciphering device 5 and deciphering device 10. The control signals 3 incorporated into the pulse train instead of the separation signals 2' are now employed for changing such key character-information.

For this purpose there is connected forwardly of the enciphering devie 5 at the transmitter 4 a signal evaluation circuit 13 which is operatively connected with a control stage of circuit 14. This control stage or circuit 14 is connected with the enciphering device 5 and the key character-information storage 7 and controls the course of the enciphering operation. The control stage or circuit 14 will be seen to comprise an input 14a for the reception of a trigger command. Upon receipt of such trigger command the control stage or circuit 14 acts upon the key character-information storage 7 and causes a change of the key character-information entered to the enciphering device 5. At the same time certain separation signals 2', which according to the graph (a) of FIG. 1 are present in the pulse train arriving via the line or conductor 6 and detected by the signal evaluation circuit 13, are replaced by the control stage of circuit 14 at the output 5a of the enciphering device 5 by control signals 3 according to the graph (c) of FIG. 1. These control signals 3 contain the information which causes at the receiver 9 a change of the key character-information.

At the receiver 9 there is present a signal evaluation circuit 15 which determines when there appear control signals 3 instead of the usual separation signals 2. Connected with this signal evaluation circuit 15 is a control stage or circuit 16 which is operatively connected with the key character-information storage 11 and the deciphering device 10. The control stage or storage 16 controls the course of the deciphering operations at the receiver 9. By virtue of the information contained in the control signals 3, the signal evaluation circuit 15 acts upon the control stage or circuit 16 which, in turn, causes the key character-information storage 11 to change the key character-information delivered to the deciphering device 10, so that at the side of the receiver 9 there again is employed the same key character-information as at the side of the transmitter 4.

Additionally, the signal evaluation circuit 15 again replaces the determined control signals 3 by the original separation or partition signals 2 present at the line 6 of the transmitter 4, so that there again appears at the output line 12 the correct pulse sequence which is the same as the pulse sequence entered at the side of the transmitter by means of the line 6.

The control stages or circuits 14 and 16, in response to appropriate control commands, ensure that the change of the key character-information at the transmitter and receiver is tuned to one another such that at the output of the signal evaluation circuit there appears the correctly deciphered information.

Now in order to explain the previously described operation, it is assumed that the system works with the key character-information correlated to the control signal combination "a" (graph (c) of FIG. 1). At a given point of time it is possible to introduce by means of a trigger command applied to the input 14a of the control stage or circuit 14 the command "key character c" (key character-information associated with the control signal combination c of the graph (c) of FIG. 1). This has the result that the control stage or circuit 14 suppresses at the output side of the enciphering device 5 the next following separation signals 2', i.e. the signals "1," "0" and instead introduces the signal combination c (graph (c) of FIG. 1), i.e. the signals "0," "1." At the same time, the control stage or circuit 14 causes the key character-information storage 7 to undertake a change of the key character-information and starting with the next following information signal group 1 (graph (a) of FIG. 1) to deliver the key character-information associated with the control signal combination c.

At the receiver 9 the signal evaluation circuit 15 detects the control signals "0," "1" which appear instead of the separation signals "1," "0" and by means of the control stage 16 ensures that the key character-information storage 11, after the next following information signal group 1, delivers the new key character-information to the deciphering device 10 and which is associated with the control signal combination c. At the same time the signal evaluation circuit 15 suppresses the introduced control signals "0", "1" and replaces such again by the original separation signals "1", "0".

As already mentioned, there can be collectively evaluated two signal combinations a, b, c according to the graph (c) of FIG. 1. In this manner, it is possible to increase the number of possibly different key character-change commands from 3 to 9. However, instead of increasing the number of commands, it is also possible to ensure for the transmission security by evaluating a number of signal combinations a, b, c, for instance as taught in the previously referred to U.S. Pat. No. 3,752,920. In this way, it is possible to detect any occurring transmission disturbances and to correct the same.

The control signals representative of a change of the key character-information also can be structured such that they do not differ from the actual information signals in the transmitted signal sequence, as such has been discussed for instance in the aforementioned Swiss Pat. No. 581,930.

It is also possible to construct equipment of the described type for duplex operation, wherein each device works in one direction as the transmitter and in the other direction simultaneously as the receiver. The key character-information storages 14 and 16 are then only present once in each device. Now if from the side of the transmitter of one of the devices, designated as the device A, there is issued a command for the change of the key character-information, then at the other device, designated as the device B, there is to be switched-through a corresponding key character-change command from the receiver part to the transmitter part, in the event that there also should occur in the opposite direction automatically a change of the key character-information.

The basic mode of operation of the equipment was heretofore described for signal sequences formed in the manner shown in the graph (a) of FIG. 1. However, the same principle can be employed for other signal sequences, wherein information signal groups are separated from one another by separation or partition signals. In this regard it is immaterial whether each information signal group is composed of the same number of signals.

Also, in the described manner it is possible to undertake at a transmission which is in progress a change of the key character-information, without having to interrupt such information transmission.

While there are shown and described present preferred embodiments of the invention, it is to be distinctly understood that the invention is not limited thereto, but may be otherwise variously embodied and practiced within the scope of the following claims.
ACCORDINGLY,
What is claimed is:

1. An apparatus for the transmission end-enciphering and reception end-deciphering of information, comprising:
    means defining a transmitter station;
    said transmitter station comprising:
        an enciphering device for receiving plain text in the form of information signal groups separated from one another by separation signals;
        a key character-information storage connected with said enciphering device;
        said key character-information storage delivering key character-information needed for enciphering to said enciphering device;
        a controllable control circuit connected with said key character-information storage;
    means defining a receiver station;
    said receiver station comprising:
        a deciphering device for deciphering the received information;
        a key character-information storage connected with said deciphering device;
        said key character-information storage delivering the key character-information needed for deciphering to said deciphering device;
        a control circuit connected with said key character-information storage;
    said key character-information storage at the transmitter station and said key character-information storage at said receiver station storing at least two different types of key character-information which can be selectively delivered to the related enciphering device and the deciphering device;
    said control circuit at the transmitter station, when activated, causing a change of the key character-information delivered by the key character-information storage at the transmitter station to the enciphering device and replacing the separation signals between the information signal groups, by virtue of such change, with control signals representative of the key character-information;
    said control circuit at the receiver station upon detection of the control signals indicative of the change of the key character-information causing a corresponding change of the key character-information delivered by the key character-information storage at the receiver station to the deciphering device, and replacing such control signals by the separation signals originally introduced at the transmitter station, so that there appears at the output side of the deciphering device at the transmitter station a signal sequence which again corresponds to the signal sequence entered to the enciphering device at the receiver station.

2. The apparatus as defined in claim 1, wherein:
    said control circuit at the transmitter station comprises a signal evaluation circuit connected forwardly of and in circuit with said enciphering device;
    a control stage connected with the signal evaluation circuit, the enciphering device and the key character-information storage of the receiver station;
    said control stage when activated, and in response to the detection of the separation signals by the signal evaluation circuit, causing a change of the key character-information delivered by the key character-information storage at the transmitter station and replacement of the separation signals by the control signals representative of the change of the key character-information.

3. The apparatus as defined in claim 2, wherein: said control stage includes input means for receiving trigger commands causing a change of the key character-information.

4. The apparatus as defined in claim 1, wherein:
said control circuit at the receiver station comprises a signal evaluation circuit arranged after and in circuit with the deciphering device;
a control stage connected with the signal evaluation circuit, the deciphering device and the key character-information storage of the receiver station;
said signal evaluation circuit upon determination of control signals causing by means of the control stage a change of the key character-information delivered by the key character-information storage at the receiver station and replacing the control signals by the original separation signals.

5. The apparatus as defined in claim 1, wherein:
said key character-information storage at the transmitter station and said key character-information storage at the receiver station comprise common key character-information storage means.

* * * * *